(12) United States Patent
Holostov (10) Patent No.: US 8,694,622 B2
(45) Date of Patent: Apr. 8, 2014

(54) MONITORING AND CONTROLLING NETWORK COMMUNICATIONS

(75) Inventor: Vladimir Holostov, Hadera (IL)

(73) Assignee: Microsoft Corporation, Redmond, WA (US)

( * ) Notice: Subject to any disclaimer, the term of this patent is extended or adjusted under 35 U.S.C. 154(b) by 1056 days.

(21) Appl. No.: 11/867,165

(22) Filed: Oct. 4, 2007

(65) Prior Publication Data

US 2009/0094665 A1 Apr. 9, 2009

(51) Int. Cl.
 *G06F 15/16* (2006.01)
 *G06F 15/173* (2006.01)
 *H04L 29/06* (2006.01)

(52) U.S. Cl.
 USPC .............................. 709/224; 709/230; 726/1

(58) Field of Classification Search
 USPC .............................. 709/223, 224, 230; 726/1
 See application file for complete search history.

(56) References Cited

U.S. PATENT DOCUMENTS

| | | | |
|---|---|---|---|
| 5,995,091 A * | 11/1999 | Near et al. ..................... | 715/201 |
| 6,023,456 A | 2/2000 | Chapman et al. | |
| 6,832,248 B1 * | 12/2004 | Byrnes .......................... | 709/223 |
| 6,947,985 B2 * | 9/2005 | Hegli et al. ................... | 709/224 |
| 6,990,592 B2 | 1/2006 | Richmond et al. | |
| 7,106,756 B1 | 9/2006 | Donovan et al. | |
| 7,143,159 B1 | 11/2006 | Grace et al. | |
| 7,143,442 B2 | 11/2006 | Scarfe et al. | |
| 7,185,073 B1 | 2/2007 | Gai et al. | |
| 7,219,142 B1 | 5/2007 | Parekh et al. | |
| 7,715,827 B2 * | 5/2010 | Yoo ............................ | 455/412.1 |
| 2004/0073916 A1 | 4/2004 | Petrovic et al. | |
| 2004/0143658 A1 | 7/2004 | Newton et al. | |
| 2004/0202348 A1 | 10/2004 | Kuzma | |
| 2004/0252646 A1 | 12/2004 | Adhikari et al. | |
| 2004/0257994 A1 * | 12/2004 | Paskett et al. ................ | 370/230 |
| 2005/0288939 A1 | 12/2005 | Peled et al. | |
| 2006/0031942 A1 * | 2/2006 | Jones et al. .................... | 726/27 |
| 2007/0067794 A1 | 3/2007 | Russell et al. | |
| 2007/0086352 A1 | 4/2007 | Tuffin et al. | |
| 2007/0186003 A1 * | 8/2007 | Foster et al. .................. | 709/231 |
| 2008/0022005 A1 * | 1/2008 | Wu et al. ........................ | 709/231 |
| 2008/0177893 A1 * | 7/2008 | Bowra et al. .................. | 709/231 |

FOREIGN PATENT DOCUMENTS

WO WO0135676 A1 5/2001
WO WO2007015228 A1 2/2007

OTHER PUBLICATIONS

"Monitoring Audio, Video, and Peer-to-Peer Applications", NetScout, pp. 1-2, 2006.
"What's New: Finding Significant Differences in Network Data Streams", CNET Networks Inc., pp. 1-3, 2007.
"IBM WebSphere Telecom Web Services Server", IBM Corporation, 2006, pp. 1-4.

(Continued)

*Primary Examiner* — Brian J Gillis
(74) *Attorney, Agent, or Firm* — Ben Tabor; Kate Drakos; Micky Minhas (57) ABSTRACT

Aspects of the subject matter described herein relate to monitoring and controlling network communications. In aspects, communication components receive a communication from a node. The communication components determine a potential use of the communication that may be used for reporting and enforcement purposes. The communication components monitor subsequent communications and store usage information including duration in a store. In addition, the communication components may enforce a policy that depends on the potential use of a communication and the usage information.

20 Claims, 5 Drawing Sheets

(56) References Cited

OTHER PUBLICATIONS

Guo, et al., "Analysis of Multimedia Workloads with Implications for Internet Streaming", WWW May 10-14, 2005, ACM, 2005, pp. 519-528.

Antoniades, et al., "Appmon: An Application for Accurate per Application Network Traffic Characterization", In Proceedings of IST Broadband Europe, Dec. 11-14, 2006, pp. 1-6.

Wright, et al., "On Inferring Application Protocol Behaviors in Encrypted Network", The Journal of Machine Learning Research, vol. 7, Dec. 2006, Charles V. Wright, Fabian Monrose, and Gerald M. Masson, 2006, pp. 2746-2769.

Wright, et al., "Using Visual Motifs to Classify Encrypted Traffic", Proceedings of the 3rd International Workshop on Visualization for Computer Security, Conference on Computer and Communications Security, Nov. 3, 2006, ACM, 2006, pp. 41-50.

"Classify Network Traffic", retrived on Jul. 3, 2007 at <<http://support.packeteer.com/documentation/packetguide/current/solutions/analysis/classify-network-traffic.htm>>, pp. 1-2.

\* cited by examiner

MONITORING AND CONTROLLING NETWORK COMMUNICATIONS

BACKGROUND

Today almost every information worker has access to the Internet and many organizations have liberal policy that allows employees to browse any sites that do not pose security or liability risks. Network usage, once consisting mainly of Internet browsing, now often includes watching video clips or live casts, listening to audio, engaging in voice over IP, video chats, file sharing, gaming, application data sharing, and many other uses. Although these uses sometimes take considerable bandwidth, more significantly, when used without limitations, they often reduce employee productivity. Network administrators are tasked with enforcing relevant policies related to employee productivity and ensuring that the bandwidth is spent wisely and is available for business-critical tasks and applications. The tools network administrators have to work with, though, are inadequate.

SUMMARY

Briefly, aspects of the subject matter described herein relate to monitoring and controlling network communications. In aspects, communication components receive a communication from a node. The communication components determine a potential use of the communication that may be used for reporting and enforcement purposes. The communication components monitor subsequent communications and store usage information including duration in a store. In addition, the communication components may enforce a policy that depends on the potential use of a communication and the usage information.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
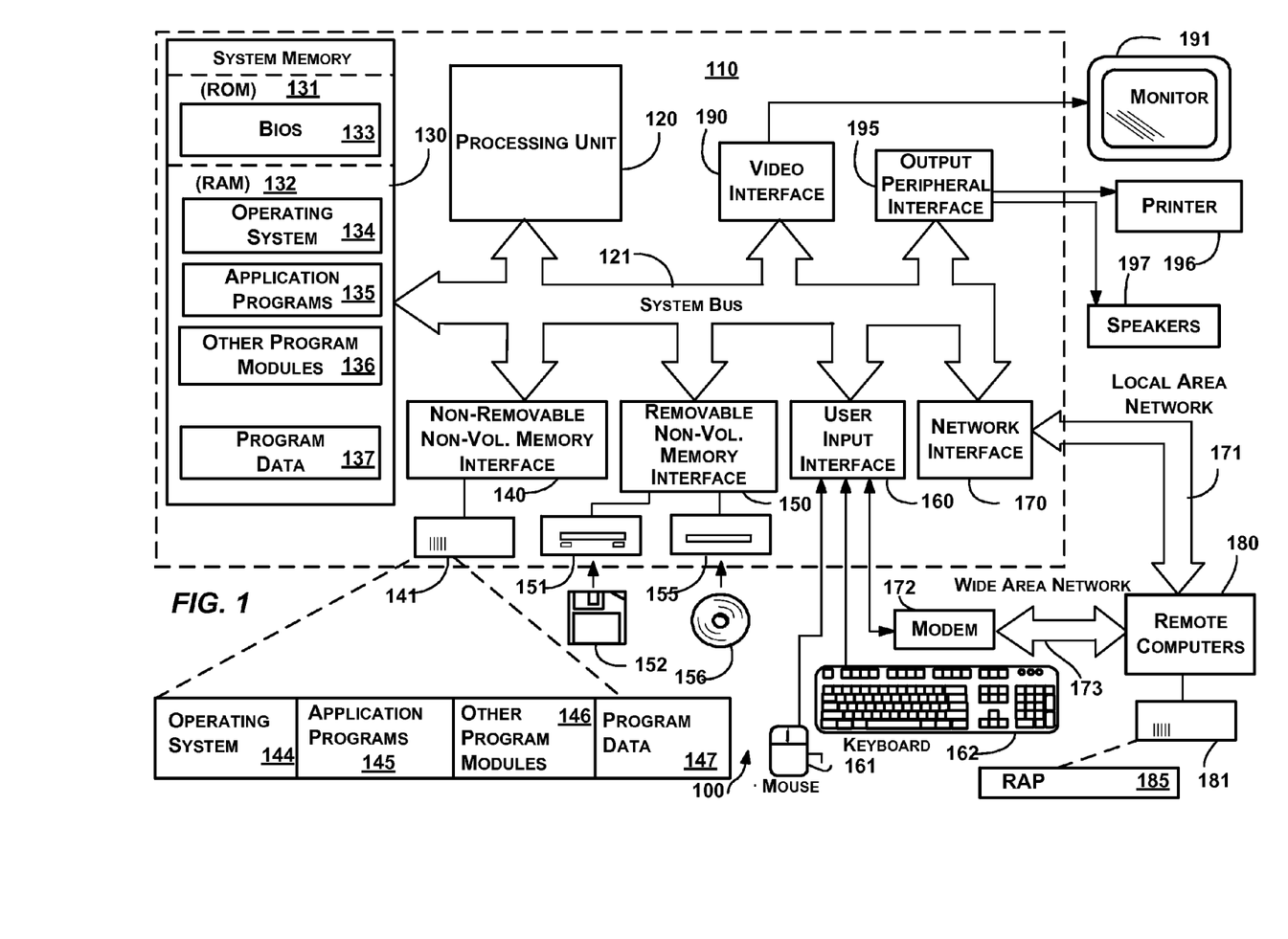
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like.

These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Monitoring and Controlling Communication

As mentioned previously, network bandwidth, especially to the Internet, may be an expensive or scarce resource. More significantly, however, some network activities may negatively impact employee productivity. For example, employees may use the network to play multiplayer computer games. Although some multiplayer games may consume relatively little bandwidth, they may greatly affect worker productivity. As another example, employees may watch or listen to multimedia content not related to their work which may also affect worker productivity.

Some employees, however, may need or desire to engage in particular types of network use or may need to have extended access to content or online services to perform their jobs. Thus, limiting browsing time, blocking access to certain sites, and bandwidth limitation may be too indiscriminate, by themselves, to apply to all employees of a company. In one embodiment, however, one or more of the mechanism mentioned above may be used in addition to aspects of the subject matter described herein.

Figure 2:
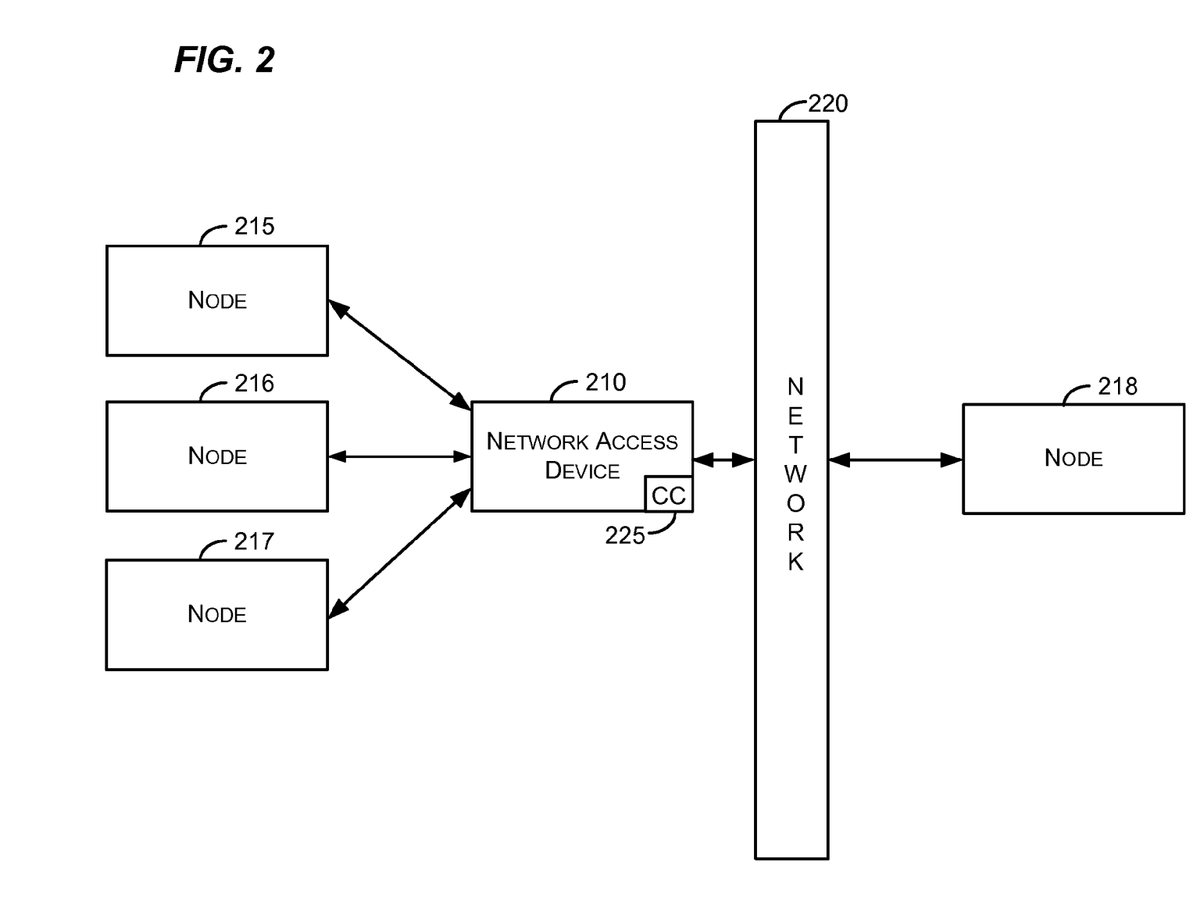
FIG. 2 is a block diagram representing an exemplary environment in which aspects of the subject matter described herein may be implemented.

FIG. 2 is a block diagram representing an exemplary environment in which aspects of the subject matter described herein may be implemented. The environment includes a network access device 210, nodes 215-218, and a network 220 and may include other entities (not shown). The various entities may communicate with each other via various networks including intra- and inter-office networks and the network 220. In an embodiment, the network 220 may comprise the Internet. In an embodiment, the network 220 may comprise one or more private networks, virtual private networks, and the like. The network access device 210 may include or have access to communication components 225 that are described in more detail in conjunction with FIG. 3.

Each of the nodes 215-218 may be implemented on or as one or more computers (e.g., the computer 110 as described in conjunction with FIG. 1). The nodes 215-217 may comprise workstations at a company that communicate with the node 218 via the network access device 210. The node 218 may be located at any location accessible through the network 220 or may even be located on a network that is local to the nodes 215-217. In today's world, this location may be at a data center, at a company website, on a user's desktop computer, or in some other place to name a few locations.

The node 218 comprises any device that is capable of communicating with one or more of the nodes 215-217. The node 218 may perform the role of a server, a peer, and/or a client and may switch from one role to another.

When the node 218 performs as a server, it may deliver content to a requesting node. Content may include such things as video, audio, text, graphics, game or other interactive information, data, other digital or digitized material, a combination of the above, and the like. In one embodiment, the term content refers to content that spans time such as multimedia content, video, audio, gaming content, file sharing, application data sharing, and so forth. In this embodiment, content may not include a single picture, text, or graphics. In another embodiment, however, the term content refers to any type of content however presented.

In one embodiment, the node 218 may provide content in the form of a stream of bytes. For example, a content server node that serves as a "radio station" may provide a stream of bytes that can be reconstructed into audio. A node that requests content from such a content server may be presented with the current broadcast of bytes rather than a file that includes a segment of the broadcast.

Even content servers that host segments of content may present these segments of content as streams of bytes. For example, a content server that hosts video may present the video as a stream of bytes which a browser, plug-in, application, or the like on a requesting node may reconstruct to present the video.

In another embodiment, the node 218 may provide content in a file format in which a request for content results in providing an entire file related to the content. In some embodiments, there may be little if any difference between a stream of bytes and a file, as the stream of bytes may be assembled into a file by a requesting node and a file may be transmitted as a stream of bytes.

The network 220 (or at least the links from the entities to the network 220) may be a relatively slow and bandwidth limited network, although aspects of the subject matter described herein may also be applied to high speed and high bandwidth networks. Indeed, there is no intention to limit aspects of the subject matter described herein to just low bandwidth or high latency networks. Furthermore, it will be recognized by those skilled in the art that aspects of the subject matter may be employed between any two entities connected by any type of network.

The network access device 210 may comprise a firewall, router, computer (e.g., such as the computer 110 of FIG. 1), or the like. The network access device 210 may receive packets to and from the nodes 215-217. The network access device 210 may consult a policy repository and usage data to determine whether a packet is allowed to proceed.

In addition, the network access device 210 may determine a potential use of a communication. The network access device 210 may use various characteristics about a communication to determine the communication's potential use. For example, a potential use of a communication may be determined based on the protocol used for the communication. A protocol may involve the use of one or more port numbers, a procedure for establishing a session, a procedure for communicating information over the network, and other procedures. These port number(s), procedures, and traffic patterns associated with the protocol may be used to identify the protocol. The port number(s), traffic patterns, and/or procedures that are sufficient to identify the protocol are sometimes referred to as the protocol's "signature." Note that some protocol may operate over different port numbers while other protocols operate via a fixed port number, so a port number may or may not be part of a protocol's signature. Aspects of the subject matter described herein may be applied to any protocol that has distinctive network characteristics.

A potential use of a communication may also be determined based on an address included in the communication or a location of the content. For example, a communication to an address of a game server may indicate that the potential use is to play an online multiplayer game. An address may comprise or correspond to a Uniform Resource Locator (URL) for example. This URL may be used to index a database that identifies the potential use of the communication as described below.

The term "potential use" is used as it may be difficult to determine the actual use of a communication. In particular, it may be possible to disguise one use as another. For example, a multimedia streaming protocol could be used to share files or even play a game. A communication component may determine that a communication has a particular potential use even though the communication may be used for another use.

There are many potential uses for a communication with the node 218. Some of these include watching video clips or live casts, listening to audio, engaging in voice over Internet Protocol (VoIP) sessions, video chats, file sharing applications, multiplayer games, application data sharing including whiteboard sharing, and the like. The list above is not intended to be all-inclusive and those skilled in the art will recognize many other applications that involve network usage.

The potential use of a communication may also be further classified to indicate a type or a category. Some exemplary types include video, audio, and video/audio, but it will be recognized that there may be more, fewer, and/or different types. Some exemplary categories include news, sports, entertainment, adult content, financial, gaming, and the like, but it will be recognized that there may be more, fewer, and/or different categories. Furthermore, the type and categories may overlap and/or may be hierarchical. For example, news may be presented in a video and/or audio format. As another example, entertainment may be comprised of various types of entertainment such as adult content, gaming, music videos, gambling, concerts, and other entertainment.

The network access device 210 may track the length of a communication or content transmitted in the communication. As used herein, the length of a communication is sometimes referred to as duration. In one embodiment, for a communication that transmits multimedia, length may refer to the normal playing time of the multimedia received. For example, with a relatively high speed connection, a node may be able to download content faster than the content is normally presented to a user. For example, the node may download 20 minutes of video in 5 minutes. The network access device 210 may examine the downloaded content and may determine the normal playing time length of the content.

In a relatively low speed connection, a node may take longer to download content than it normally takes the content to be presented to a user. For example, a node may download 5 minutes of video in 20 minutes. Again, the network access device 210 may examine the downloaded content and may determine the normal playing time length of the content.

In another embodiment, length may refer to the actual time that data was being transferred. For example, if it takes 20 minutes to download 5 minutes of video, the network access device 210 may determine that 20 minutes was devoted to the download.

The term "download" is to be read to comprise receiving electronic data from another computer. The data may take the form of a stream, file, data structure, some combination of the above, or the like. In embodiment, when a first computer downloads electronic data from a second computer, the first computer may subsequently save the electronic data as a file on a nonvolatile storage device accessible via the computer. In another embodiment, when a computer downloads electronic data, the computer may not subsequently save this electronic data to a non-volatile storage device for future uses. Rather, the downloaded data may be temporarily stored (e.g., buffered) and consumed (e.g., watched, listened to, or otherwise interacted with by a user), but not stored permanently on a non-volatile storage device.

In some embodiments, both types of length may be determined by the network access device 210. For example, if a node is able to download 20 minutes of video in 5 minutes, both the expected normal playing time of the video and the time it took to download the video may be determined.

In non multi-media type communications, length may be determined as the length of time that a connection was open related to the communication. For example, if a user has a whiteboard sharing application open and is communicating with another user, the length of the session may be used.

The network access device 210 may store the length of the communication together with the one or more categories associated with the content, if applicable. In addition, the network access device 210 may store one or more URLs that indicate the site or sites from which the communication was received as well as user information that indicates the user that initiated the communication. If the user is part of a set of users assigned to a group, a group identifier may also be stored with the information. In another embodiment, group information may not be stored with the information and may instead be retrieved from another source when viewing the information. In addition, values such as average bandwidth consumed, total bytes downloaded, and the time at which the communication occurred may also be monitored and stored.

The information may then be presented in a variety of formats. These formats may be summarized by organization, group, individual, and so forth. Some exemplary formats that are not intended to be all-inclusive or exhaustive but merely exemplary include:

1. A summary of audio/video channels consumed by group. The summary may be grouped by type, content category, popularity, and/or other characteristics. For example, a summary may indicate that a marketing group comprising 20 people uses content of News-Video: 30%, News-Audio: 5%, Sports-Video: 60%, Sports-Audio: 0.5%, Other-Video: 30.5%, Other-Audio: 4%.

2. A summary of average viewing/listening times. For example, for a company the video average may be 10 hours for a month per employee while the audio average may be 45 hours a month per employee.

3. A list of top consumers of multimedia streams with type, content category, duration, and bandwidth. For example, John: 60 hours of video sports, news, and adult; Peter: 55 hours of general entertainment.

4. A per user list of categories with content type, duration, and bandwidth.

5. A list by employee of non-multimedia use. For example: John Smith: 15 Video chats with total duration of 3 hours, 45 VoIP sessions with total duration of 4 hours, 20 multiplayer games with total duration of 14 hours.

It will be recognized that the information may be presented in a variety of reports that include various fields without departing from the spirit or scope of aspects of the subject matter described herein.

The network access device 210 may also enforce policies with respect to network usage. A policy may be expressed as a set of one or more rules. A rule may be expressed by a predicate, an action to take if the predicate is true, and/or an action to take if the predicate is false. A predicate may involve one or more conditions some or all of which may need to be satisfied for the predicate to be true.

For example, a rule may state that an employee can obtain sports, news, and entertainment audio and/or video content of a length of no more than 20 minutes every day. If the employee is requesting sports, news, and/or entertainment audio and/or video content and has not exceeded 20 minutes of such content in a day, the network access device 210 may allow the request to proceed and the content to be provided. If at any time, the content exceeds 20 minutes of length, in one embodiment, the network access device 210 may forcefully disconnect the employee's device from the content server by breaking the connection.

As another example, a policy may state that if certain content is viewed for more than a certain length, that an alert is generated but that the user may continue to view the content. For example, a rule may indicate that if an employee requests more than 30 minutes of sports video content in a day that an alert will be sent to a system administrator or the like.

As another example, a policy may indicate that all employees are allowed four hours of VoIP sessions every month. Exceeding this limit may cause a notification to be sent to an employee's manager.

As another example, a policy may indicate that all employees are allowed two hours of video chat every week. If an employee attempts to exceed this limit, a network access device may forcefully disconnect the video chat session and send a notification to an administrator.

As another example, a policy may indicate that a market research team is allowed ten hours of multiplayer games every month. Exceeding this limit may cause a notification to be sent to their manager.

Again, the examples above are not all-inclusive or exhaustive. Indeed, a policy may be created for almost any conceivable set of conditions that can be measured or obtained by the network access device 210 without departing from the spirit or scope of aspects of the subject matter described herein.

Although the environment described above includes a network access device and nodes in various configurations, it will be recognized that more, fewer, and/or a different combination of these and other entities may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 3:
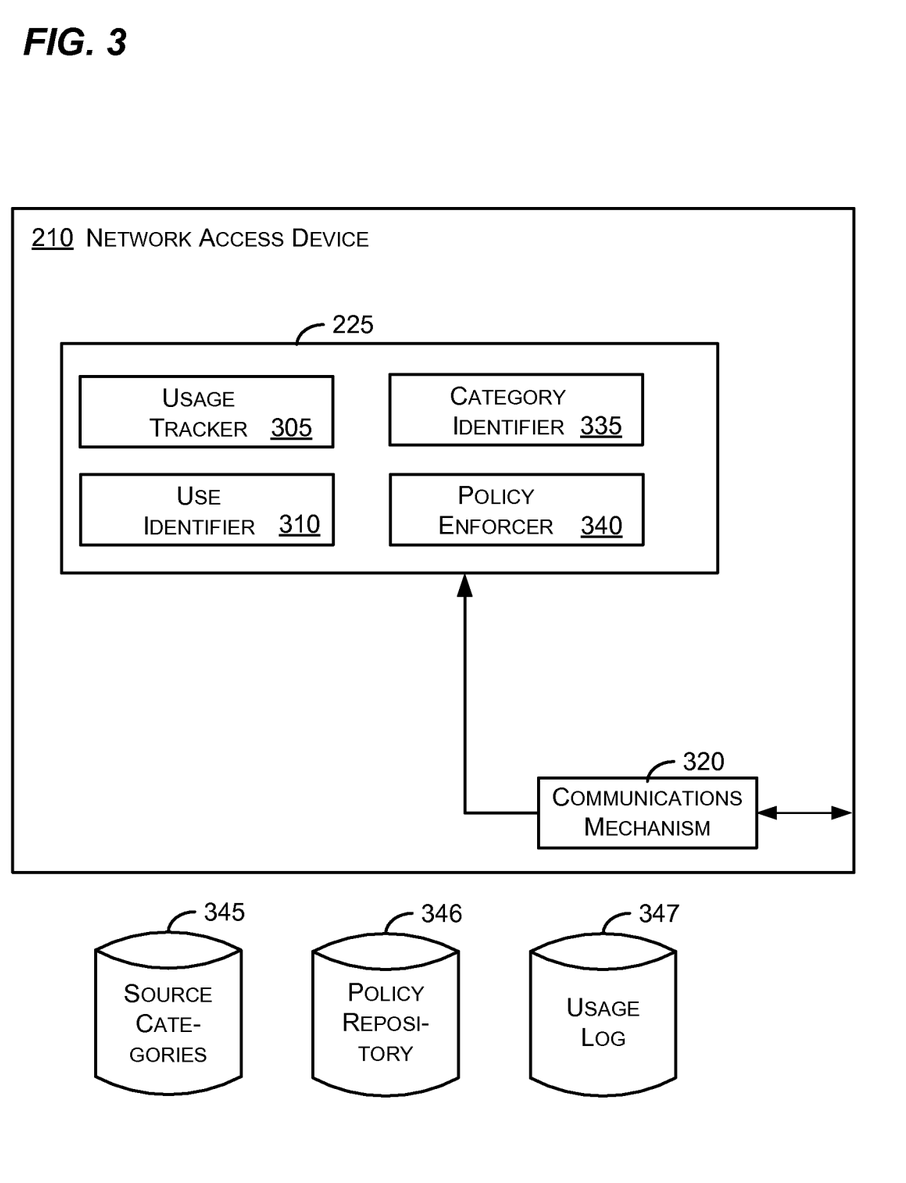
FIG. 3 is a block diagram illustrating various components associated with a network access device in accordance with aspects of the subject matter described herein.

FIG. 3 is a block diagram illustrating various components associated with a network access device in accordance with aspects of the subject matter described herein. The components illustrated in FIG. 3 are exemplary and are not meant to be all-inclusive of components that may be needed or included. In other embodiments, the components or functions described in conjunction with FIG. 3 may be included in other components or placed in subcomponents without departing from the spirit or scope of aspects of the subject matter described herein.

Turning to FIG. 3, the network access device 210 may include communication components 225 and a communications mechanism 320. The communication components 225 may include a usage tracker 305, a use identifier 310, a category identifier 335, and a policy enforcer 340. Although in one embodiment, the communication components 225 may reside on the network access device 210, in other embodiments, one or more of these components may reside on other devices. For example, one or more of these components may be provided as services by one or more other devices. In this configuration, the network access device 210 may cause the functions of these components to be performed by interacting with the services on the one or more other devices and providing pertinent information.

The network access device 210 may have access to various stores 345-347. The store 345 may comprise a database that associates URLs with categories. This database may be updated manually, semi-automatically, or fully automatically by people, components, and/or services that scan the Internet or some other network and classify content found thereon into categories. In one embodiment, the category identifier 335 may use a requested URL to determine a category by using this database.

In another embodiment, the category identifier 335 may attempt to dynamically determine a category for content based information associated with and/or included in the content. In one embodiment, content may have header fields or the like that indicate a category of the content. In another embodiment, the content may include text, pictures, tags, or other information that may be used to categorize the content.

The store 346 may include policies that may be used by the policy enforcer 340 to enforce policies on content usage. These policies may be changed when desired by a system administrator or the like.

The store 347 may include usage information about network communication by users and groups. The nature of this usage information was described previously. The usage tracker 305 may store usage information in the store 347 which may then be used for providing reports and enforcement as described previously.

Each of the stores 345-347 may be stored on or external to the network access device 210 without departing from the spirit or scope of aspects of the subject matter described herein. Furthermore, two or more of the stores 345-347 may be located together on one storage device or may each be on separate storage devices without departing from the spirit or scope of the subject matter described herein. In one embodiment, the functionality of one or more of the stores may be performed by one or more services on one or more devices external to the network access device 210.

The use identifier 310 may identify a potential use of a communication. If the potential use is a multimedia stream such as video and/or audio, the use identifier 310 may further identify content type by examining the content itself and/or by using a store similar to the store 345 that associates URLs with content type, for example. In one embodiment, the use identifier 310 identifies content as video or audio, where video may include audio but audio does not include video. In another embodiment, use identifier 310 may identify a communication as one of the other types of potential uses using a protocol's "signature" as described previously.

In one embodiment, one or more components on a requesting node may perform the functions of the communication components 225 of the network access device 210 for the particular requesting node. For example, in one embodiment, the one or more components on the requesting node may be called by a network stack of a requesting node. These components may perform similarly to how the communication components 225 perform except on a single node basis. This may be used for a requester that may not use the network access device 210 to request content. In this configuration, the one or more components on the requesting node may seamlessly examine communications and may store usage information and enforce policies as needed without employing a separate network access device 210.

Figure 4:
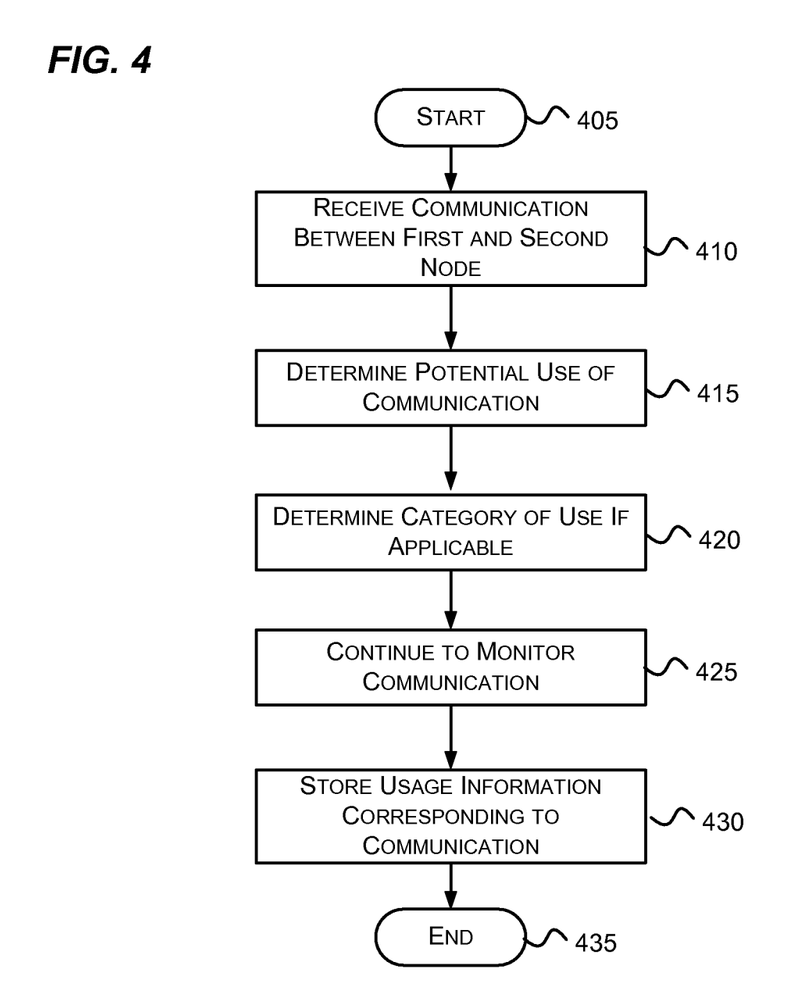
FIGS. 4-5 are flow diagrams that generally represent exemplary actions that may occur in monitoring communication and enforcing policies in accordance with aspects of the subject matter described herein.
Figure 5:
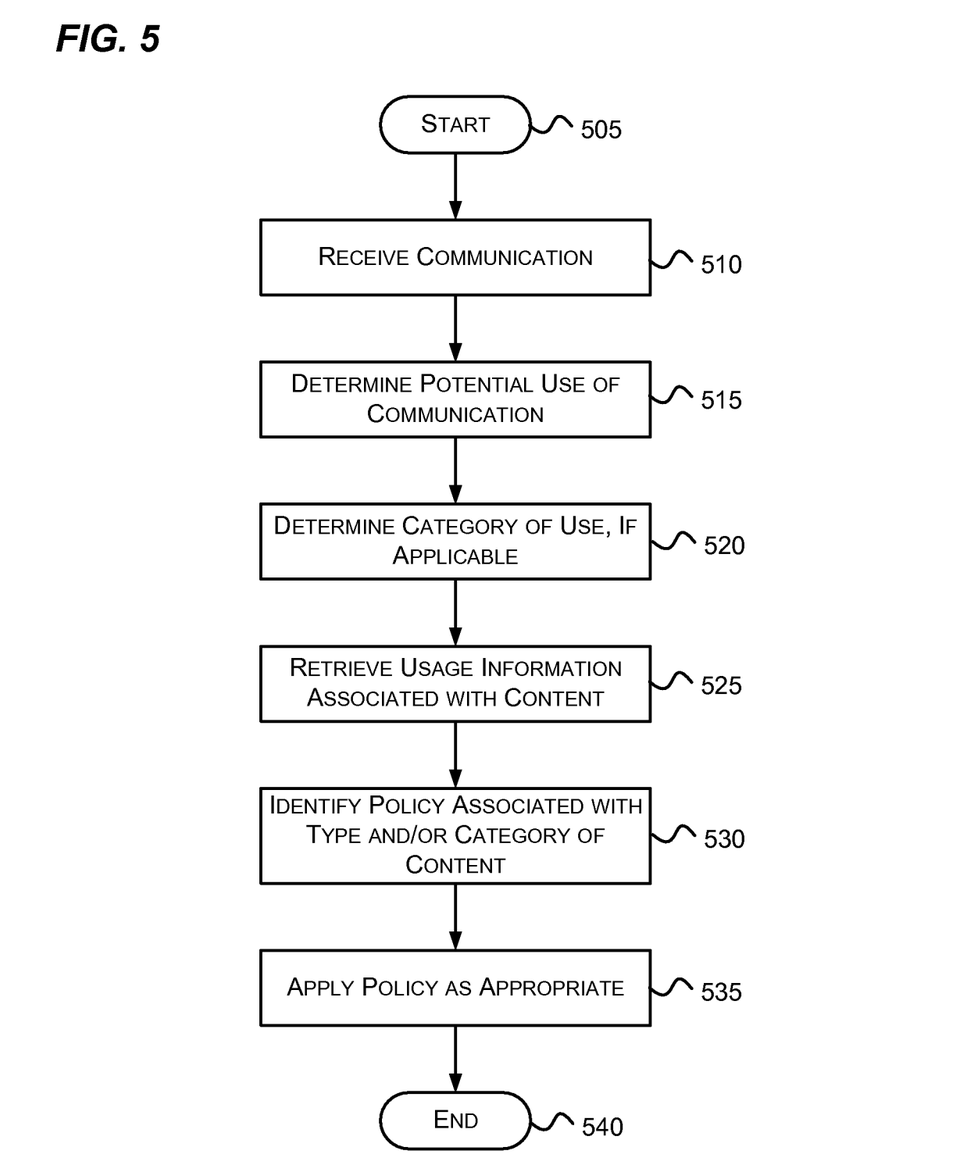

FIGS. 4-5 are flow diagrams that generally represent exemplary actions that may occur in monitoring communication and enforcing policies in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 4, at block 405, the actions begin. At block 410, a part of a communication (e.g., a packet) between a first and second node is received. For example, referring to FIG. 2, the network access device 210 may receive a request for content from the node 215. The content may be located on the node 218. The request may come from a user who is logged onto the node 215.

At block 415, a determination is made as to a potential use of the communication. For example, referring to FIG. 3, the use identifier 310 may determine a signature of a communication to determine the communication's potential use.

At block 420, the category of the potential use is determined, if applicable. For example, referring to FIG. 3, the category identifier 335 uses the source categories data store 345 to match a URL embedded in the request to a category of sports content. In one embodiment, categories may be applicable only in the content of multimedia content. In another embodiment, categories may also be applied to other types of potential use. For example, the category of application data sharing (e.g., whiteboard sharing, file sharing, music sharing, etc.) or category of game may be determined at block 420.

After block 420, policy enforcement activities may occur. These enforcement activities may occur in parallel with other actions that occur after block 420. As these have been addressed above and are dealt with again in relation to FIG. 5, they are not described in more detail here.

At block 425, a second part (e.g., subsequent packets) in the communication is monitored as appropriate. For example, referring to FIG. 3, the usage tracker 305 may monitor the connection and examine content that is returned from the content server. Communication may be monitored to determine the duration of the content or communication, for example.

At block 430, usage information is stored corresponding to the communication. For example, referring to FIG. 3, the usage tracker 305 may store potential use, category, user ID, and duration in the usage log data store 347.

At block 435, the action end.

Turning to FIG. 5, at block 505, the actions begin. At block 510, a communication is received. This communication may come from a node local to a network access device (e.g., one of nodes 215-217 of FIG. 2) or from a node external to the network access device (e.g., node 218). For example, referring to FIG. 2, the network access device may receive content from the node 218. This content may be in response to a request from the node 215.

At block 515, a potential use of the communication is determined. For example, referring to FIG. 3, the use identifier 310 may examine the bit stream between two nodes and may determine that the potential use is for downloading video. Note that if the potential use of a continuing communication has previously been determined, that this step may be skipped. In another embodiment, however, the actions associated with block 515 may be performed again each time a communication is received even if it is from the same node.

At block 520, one or more categories associated with the communication is/are determined, if applicable. For example, referring to FIG. 3, the category identifier 335 may use the database in the store 345 together with a content server's IP address to determine that the content is news. Note again, that if the category of a continuing communication between two nodes has already been determined, this step may be skipped. In another embodiment, however, the actions associated with block 520 may be performed again each time a communication is received even if it is from the same node.

At block 525, usage information associated with the potential use is retrieved. For example, referring to FIG. 3, a policy enforcer 340 retrieves usage information related to news video content from the usage log 347. The usage information may indicate that the user has already watched 10 minutes of news video for the day.

At block 530, a policy associated with the potential use and/or category of content is identified. For example, referring to FIG. 3, the policy enforcer 340 obtains one or more policies from the policy repository 346 using the potential use and/or category previously identified.

At block 535, the policy is applied as appropriate. For example, referring to FIG. 3, the policy enforcer 340 may allow the user to obtain 20 more minutes of news video for that day and may forcefully disconnect the user if the new video content received will exceed that amount.

At block 540, the actions end.

In one embodiment, the actions associated with FIGS. 4 and 5 may be combined. For example, the actions associated with blocks 505-520 may be combined with the actions associated with blocks 405-420. After these actions, the actions associated with blocks 525-535 may be performed. If policy allows the communication to continue, the actions associated with blocks 425-430 may then occur in conjunction with continued policy checking to determine whether to terminate a communication or perform another action dictated by policy as appropriate.

As can be seen from the foregoing detailed description, aspects have been described related to monitoring and controlling network communications. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer-readable storage, device having computer-executable instructions, which when executed perform actions, comprising:
   receiving a part of a communication;
   determining a potential use of the communication;
   monitoring a subsequent part of the communication;
   storing an indicator of the potential use and a duration corresponding to the communication in a data store, wherein the duration corresponds to a time to playback, at a normal playback speed, content transmitted via the communication, wherein the content includes a header field that identifies a category; and
   enforcing a policy that depends on the potential use and the duration, wherein the potential use is independent of a source of the communication, and wherein the policy affects communications having the potential use without affecting communications having a different potential use.

2. The computer-readable storage device of claim 1, wherein determining a potential use of the communication comprises identifying a protocol associated with the communication or identifying a category of content of the communication.

3. The computer-readable storage device of claim 1, further comprising determining a category of the content transmitted via the communication by accessing a store that associates an identifier associated with a destination of the communication with a category, wherein the identifier comprises a uniform resource locator used to identify resources on a network.

4. The computer-readable storage device of claim 3, wherein monitoring a subsequent part of the communication comprises examining packets via a device that is intermediate between the source of the communication and the destination of the communication.

5. The computer readable storage device of claim 3, wherein the uniform resource locator is used to index a database that identifies the potential use of the communication.

6. The computer readable storage device of claim 1, further comprising computer executable instructions to retrieve the policy from a policy repository, the policy repository including multiple policies including a first policy that applies to potential usage related to media content and a second policy that applies to potential usage related to non-media content and wherein the first policy includes a first type of length threshold and the second policy includes a second type of length threshold.

7. The computer readable storage device of claim 6, wherein the first type of length threshold relates to expected normal playback time and the second type of threshold relates to session connection time.

8. The computer readable storage device of claim 6, further comprising computer executable instructions to provide a report that includes information gathered from monitoring the communication.

9. The computer readable storage device of claim 8, wherein the report includes a summary of media content consumed by a group and wherein the summary includes content type, content category, and usage information.

10. The computer readable storage device of claim 9, wherein the report includes at least one of average viewing or listening times, a list of top consumers of multimedia content and associated type, category, and duration information, a per user list of categories with content type and duration information, and non-media usage by employee information.

11. The computer readable storage device of claim 6, wherein the first policy has an enforcement action of disconnecting a device from a content server and the second policy has an enforcement action of providing an alert while permitting the communication to continue.

12. The computer readable storage device of claim 1, wherein the policy relates to a subset of employees of a company and restricts an amount of time per a given time period with respect to a particular category of content.

13. The computer readable storage device of claim 12, wherein the subset of employees is a particular team, the time period is one of a day, a week, or a month, and the particular category of content relates to games.

14. A method implemented at least in part by a computer, the method comprising:
receiving a communication comprising a file from a content source;
determining a potential use of the communication, wherein the potential use is based on a category of content of the communication and is independent of the content source, wherein the category of content is indicated by a header field of the file;
while connected to the content source, determining a first duration corresponding to a time to playback the file at a normal playback speed when disconnected from the content source;
identifying a policy that limits communications having the potential use without limiting communications having a different potential use, the policy indicating a second duration that is dependent on the potential use; and
enforcing the policy to limit the communications having the potential use without limiting communications having a different potential use, based at least in part on the first and second durations.

15. The method of claim 14, wherein the communication comprises bits sent between a first node and a second node and wherein enforcing the policy based at least in part on the first and second durations comprises stopping the communication when the first duration plus a third duration comprising cumulative time elapsed on previous communications having the potential use is greater than the second duration.

16. The method of claim 14, wherein the communication comprises bits sent between a first node and a second node and wherein enforcing the policy based at least in part on the first and second durations comprises allowing the communication to continue and sending an alert when the first duration plus a third duration comprising cumulative time elapsed on previous communications having the potential use is greater than the second duration.

17. The method of claim 14, wherein the second duration indicates a duration that a single user is allowed to engage in communication of the potential use.

18. The method of claim 14, wherein the second duration indicates a duration that a group of users are cumulatively allowed to engage in communication of the potential use.

19. An apparatus, comprising:
a communications interface operable to receive a communication;
an identifier that identifies a potential use of the communication, wherein the potential use is based on a category of content of the communication and is independent of a source of the content, wherein the category of content is indicated by a header field of the communication;
a usage tracker operable to store usage information related to the communication, the usage information including an indicator of the potential use of the communication, an identifier of an entity associated with the communication, and a first duration associated with the communication, wherein the first duration corresponds to a time to playback, at a normal playback speed, content transmitted via the communication; and
a policy enforcer operable to apply a policy on whether to allow the communication to continue based at least in part on the usage information and a second duration, the second duration being included in the policy, wherein the policy depends upon the potential use and limits communications having the potential use without limiting communications having a different potential use.

20. The apparatus of claim 19, wherein the second duration comprises a duration of cumulative communication having the potential use, wherein the policy enforcer performs an enforcement action when the second duration is exceeded.

* * * * *